(12) United States Patent
Tuckey et al.

(10) Patent No.: US 11,921,482 B2
(45) Date of Patent: Mar. 5, 2024

(54) METHOD OF CONTROLLING A MICROGRID, POWER MANAGEMENT SYSTEM, AND ENERGY MANAGEMENT SYSTEM

(71) Applicant: Hitachi Energy Ltd, Zürich (CH)

(72) Inventors: Andrew Tuckey, Livingstone (AU); Francesco Baccino, Savona (IT)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 17/887,188

(22) Filed: Aug. 12, 2022

(65) Prior Publication Data
US 2022/0390915 A1  Dec. 8, 2022

Related U.S. Application Data

(62) Division of application No. 16/797,412, filed on Feb. 21, 2020, now Pat. No. 11,614,722.

(30) Foreign Application Priority Data

Feb. 22, 2019 (EP) ..................... 19158732

(51) Int. Cl.
*G05B 19/042* (2006.01)
(52) U.S. Cl.
CPC .... *G05B 19/042* (2013.01); *G05B 2219/2639* (2013.01)
(58) Field of Classification Search
CPC .......... G05B 19/042; G05B 2219/2639; Y04S 20/222; Y04S 40/12; H02J 3/003; H02J 13/00006; H02J 3/46; H02J 3/381; H02J 3/12; H02J 2310/10; H02J 3/14; Y02B 70/3225; Y02E 60/00; Y02P 80/14
See application file for complete search history.

(56) References Cited

U.S. PATENT DOCUMENTS

| 9,373,958 | B2 | 6/2016 | Sivakumar et al. |
| 9,690,312 | B2 | 6/2017 | Steven et al. |
| 2009/0033096 | A1 | 2/2009 | Jurkat |
| 2011/0231320 | A1* | 9/2011 | Irving ............ G06Q 30/08 713/300 |
| 2013/0245847 | A1 | 9/2013 | Steven et al. |

(Continued)

OTHER PUBLICATIONS

European Patent Office, Extended Search Report issued in App. No. 19158732.8, dated May 21, 2019, 7 pp.

(Continued)

*Primary Examiner* — Chad G Erdman
(74) *Attorney, Agent, or Firm* — Slater Matsil, LLP

(57) ABSTRACT

A method of controlling a microgrid comprises receiving, by a power management system, PMS, of the microgrid, operating point values for a plurality of controllable assets. The method comprises determining, by the PMS, an asset headroom. The method comprises determining, by the PMS, a modified operating point value that is dependent on the received operating point value of the controllable asset, the determined asset headroom of the controllable asset, and a total power offset of the microgrid. The method comprises controlling, by the PMS, the controllable assets for which the modified operating point values have been determined in accordance with the modified operating point values.

11 Claims, 10 Drawing Sheets

(56) References Cited

U.S. PATENT DOCUMENTS

| | | |
|---|---|---|
| 2014/0088781 A1 | 3/2014 | Kearns et al. |
| 2015/0381089 A1 | 12/2015 | Tarnowski et al. |
| 2021/0254599 A1 | 8/2021 | Kjalergaard et al. |
| 2021/0359525 A1* | 11/2021 | Nayebi .................. H02J 3/381 |

OTHER PUBLICATIONS

Kim et al., "Cooperative Control Strategy of Energy Storage System and Microsources for Stabilizing the Microgrid during Islanded Operation", IEEE Transactions on Power Electronics, vol. 25, No. 12, Dec. 12, 2010, pp. 3037-3048.

* cited by examiner

METHOD OF CONTROLLING A MICROGRID, POWER MANAGEMENT SYSTEM, AND ENERGY MANAGEMENT SYSTEM

FIELD OF THE INVENTION

Embodiments of the invention relate to methods, devices and systems for controlling a microgrid. Embodiments of the invention relate in particular to methods, devices and systems that use one or several forecast variables to determine operating points for controllable assets of a microgrid, such as controllable power-generating assets and/or controllable loads of a microgrid.

BACKGROUND OF THE INVENTION

A microgrid is a localized group of generators and loads. Control strategies for microgrids are getting increasingly important, also due to the increasing use of renewable energy sources (RES) or other systems with distributed energy generators (DEG). Control techniques for microgrids are described in, e.g., IEEE 2030.7-2017.

A microgrid control system may be a Power Management System (PMS) that can coordinate a plurality of individual controllable power-generating assets and discretionary load (DL) assets in a predefined way. The Operating Point (OP) of each asset may be calculated in real-time based on locally known values, such as total load, microgrid configuration, storage state of charge (SoC), current photovoltaic (PV) and wind availability, current energy market pricing etc. In such a case, the optimization that is attained may be limited because the PMS only knows local values and has only past and present-time data.

In order to further improve the determination of an operating point, an Energy Management System (EMS) may use forecasts to calculate a better optimal OP for each of the assets. Forecasts can be or can include forecast values for load profiles, photovoltaic and wind availability, weather and cloud forecasting, energy market pricing etc. With the use of past, present and forecasted data, the EMS is adapted to calculate the optimal OP for each asset.

The EMS typically provides an EMS asset operating point vector, which is also referred to as EMS OP vector, to the PMS. The PMS controls the assets so that their power values are in conformity with the operating point values included in the operating point vector for each of the controllable assets of the microgrid.

However, when one or several forecast variable values are incorrect, i.e., the actual values differ from the forecast variable values, the calculated operating point vector is typically also incorrect. This may result in power imbalance or the risk of non-optimal operation. In particular, the calculated operating point vector can often result in a total power generation that is offset from a desired target power generation or in a total power consumption in the microgrid that is offset from a desired target power consumption of the controllable assets in the microgrid, if the forecast variables are incorrect.

SUMMARY

In view of the above, there is a continued need for methods, devices, systems, and microgrids that provide enhanced robustness when an operating point vector is determined based at least in part on forecast variable values, which may be incorrect. There is a need for methods, devices, systems, and microgrids that allow the operating point of a plurality of controllable assets of the microgrid to be modified so as to at least partially compensate for a deviation of a forecast variable value from the actual value of this variable that may subsequently become available. There is a need for methods, devices, and microgrids that allow the operating point of a plurality of controllable assets to be adjusted so as to mitigate the risk that a power imbalance can occur in the microgrid.

According to the invention, methods, an energy management system (EMS), a power management system (PMS), and a microgrid as recited in the independent claims are provided. The dependent claims define embodiments.

According to a first aspect of the invention, methods and control systems are disclosed that are generally operative to modify the operating point values (such as the power setpoint or power limit of an asset). The amount by which the operating point value for each of a plurality of controllable assets is changed may be dependent on a headroom for the respective asset, i.e., a difference between an asset-specific fixed characteristic value (such as a nominal maximum or minimum power rating etc.) and the current operating point value.

The amount by which the operating point value for each of the plurality of controllable assets is changed may be a monotonously increasing function of the headroom for the respective asset.

The amount by which the operating point value for each of the plurality of controllable assets is changed may be dependent not only on the headroom for the respective asset, but on the headrooms of all controllable assets in the plurality of controllable assets. In this way, a potential deficit or surplus in power generation may be accommodated in a manner that takes into account how much headroom each of the controllable assets has.

Various effects are associated with this technique. For illustration, the technique is simple to implement and has little computational costs. The technique does not require any extra communication between a power management system, PMS, and an energy management system, EMS. Only the operating point values that are provided to the PMS need to be used by the PMS in this process.

A method of controlling a microgrid according to an embodiment comprises receiving, by a PMS of the microgrid, operating point values for a plurality of controllable assets of the microgrid. The method comprises determining, by the PMS, an asset headroom that is dependent on a difference between an asset-specific fixed parameter value for the controllable asset and the received operating point value for the controllable asset. The method comprises determining, by the PMS, a modified operating point value for each controllable asset of at least a sub-set of the plurality of controllable assets. The modified operating point value for a controllable asset may be dependent on the received operating point value of the controllable asset, the determined asset headroom of the controllable asset, and a total power offset of the microgrid. The method may comprise controlling, by the PMS, the controllable assets for which the modified operating point values have been determined in accordance with the modified operating point values.

The plurality of controllable assets may comprise controllable power-generating assets and/or controllable loads, such as controllable discretionary loads.

The method may comprise controlling, by the PMS, the controllable assets for which no modified operating point value has been determined in accordance with the received operating point values.

Determining the modified operating point value may comprise incrementing or decrementing the received operating point value by an amount that is proportional to the total power offset of the microgrid.

The total power offset may be a difference between a target power generation of controllable assets, in particular power-generating assets, of the microgrid and an actual power generation of the controllable assets, in particular power-generating assets, of the microgrid.

Determining the modified operating point value may comprise determining a product of the total power offset of the microgrid and an asset-specific scaling factor.

The asset-specific scaling factor may be dependent on the asset headroom of the controllable asset for which the operating point value is modified.

The asset-specific scaling factor may be a monotonous function of the asset headroom.

The asset-specific scaling factor may be a linear function of the asset headroom.

The asset-specific scaling factor may be dependent on the asset headroom of all controllable assets for which the operating point value is modified.

Two asset-specific scaling factors may be determined for each one of a plurality of controllable assets, one being associated with the scenario in which the total power output needs to be increased or the total power intake needs to be decreased, and the other one being associated with the scenario in which the total power output needs to be decreased or the total power intake needs to be increased.

A sum of the asset-specific scaling factors may be equal to 1. The asset specific scaling factors may be constructed in such a way or may be normalized in such a way that the sum of the asset-specific scaling factors is equal to 1.

The received operating point values may be or may comprise power setpoints. The power setpoints may be power setpoints of one or several generators and/or one or several energy storage system (ESS) and/or controllable loads, such as discretionary loads.

The received operating point values may be or may comprise power limits. The power limits may be power limits of a renewable energy sources, such as a photovoltaic module or wind power generator, and/or controllable loads, such as discretionary loads.

The received operating point values may be or may comprise load power setpoints. The load power setpoints may be load power setpoints of one or several discretional loads (DL). The load power setpoints may be discrete load power setpoints, e.g. "full power," "half power," "off," or may be continuous load power setpoints, or may be a combination of both.

The asset-specific fixed parameter value may be a nominal maximum power rating or a nominal minimum power rating.

The asset-specific fixed parameter value may be a nominal maximum power rating of a controllable power-generating asset or a nominal minimum power rating of a controllable load when a difference between actual and forecast variable values of a forecast variable results in the need for increasing power generation or reducing power consumption in the microgrid.

The asset-specific fixed parameter value may be a nominal minimum power rating of a controllable power-generating asset or a nominal maximum power rating of a controllable load. The asset-specific fixed parameter value may be a nominal minimum power rating of a controllable power-generating asset or a nominal minimum power rating of a controllable load when a difference between actual and forecast variable values of a forecast variable results in the need for reducing power generation or increasing power consumption in the microgrid.

The asset-specific fixed parameter value may be an overload power rating.

The asset-specific fixed parameter value may be a zero power rating.

The modified operating point values may be continually determined. The modified operating point values may in particular be determined independently of whether a target power generation of assets of the microgrid and an actual power generation of the assets of the microgrid differ from each other.

The modified operating point values may be determined at a fixed repetition rate, e.g. at a repetition rate shorter than 15 minutes, in particular shorter than 5 minutes or 1 minute.

The modified operating point values may be periodically determined.

A PMS for a microgrid comprises an interface operative to receive operating point values for a plurality of controllable assets of the microgrid. The PMS comprises at least one integrated semiconductor circuit operative to determine an asset headroom that is dependent on a difference between an asset-specific fixed parameter value for the controllable asset and the received operating point value for the controllable asset. The at least one integrated semiconductor circuit is operative to determine a modified operating point value for each controllable asset of at least a sub-set of the plurality of controllable assets, the modified operating point value for a controllable asset being dependent on the received operating point value of the controllable asset, the asset headroom of the controllable asset, and a total power offset of the microgrid. The at least one integrated semiconductor circuit is operative to control the controllable assets for which the modified operating point values have been determined in accordance with the modified operating point values.

The PMS may be operative to increment or decrement the received operating point value by an amount that is proportional to the total power offset of the microgrid. The total power offset may be a difference between a target power generation of assets of the microgrid and an actual power generation of the assets of the microgrid.

The PMS may be operative such that determining the modified operating point value comprises determining a product of the total power offset of the microgrid and an asset-specific scaling factor.

The PMS may be operative such that the asset-specific scaling factor is dependent on the asset headroom of the controllable asset for which the operating point value is modified.

The PMS may be operative such that the asset-specific scaling factor is a monotonous function of the asset headroom.

The PMS may be operative such that the asset-specific scaling factor is linear function of the asset headroom.

The PMS may be operative such that the asset-specific scaling factor is dependent on the asset headroom of all controllable assets for which the operating point value is modified.

The PMS may be operative such that two asset-specific scaling factors are determined for each one of a plurality of controllable assets, one being associated with the scenario in which the total power output needs to be increased and the other one being associated with the scenario in which the total power output needs to be decreased.

The PMS may be operative such that a sum of the asset-specific scaling factors is equal to 1. The asset specific scaling factors may be constructed in such a way or may be normalized in such a way that the sum of the asset-specific scaling factors is equal to 1.

The PMS may be operative such that the received operating point values are or comprise power setpoints. The power setpoints may be power setpoints of one or several generators and/or one or several energy storage system (ESS).

The PMS may be operative such that the received operating point values are or comprise power limits. The power limits may be power limits of a renewable energy resource, such as a photovoltaic or wind power generator.

The PMS may be configured such that the received operating point values may be or may comprise load power setpoints. The load power setpoints may be load power setpoints of one or several discretional loads (DL). The load power setpoints may be discrete load power setpoints, e.g. "full power," "half power," "off," or may be continuous load power setpoints, or may be a combination of both.

The PMS may be operative such that the asset-specific fixed parameter value is or includes a nominal maximum or minimum power rating.

The asset-specific fixed parameter value may be a nominal maximum power rating of a power-generating controllable asset or a nominal minimum power rating of a controllable load when a difference between actual and forecast variable values of a forecast variable results in too little power being produced by the power-generating controllable assets of the microgrid.

The asset-specific fixed parameter value may be a nominal minimum power rating of a power-generating controllable asset or a nominal maximum power rating of a controllable load when a difference between an actual variable value of a forecast variable and the forecast variable value of the forecast variable results in too much power being produced by the power-generating controllable assets of the microgrid.

The PMS may be operative such that the asset-specific fixed parameter value is or includes an overload power rating.

The PMS may be operative such that the asset-specific fixed parameter value is or includes a zero power rating.

The PMS may be operative such that the modified operating point values are continually determined. The PMS may be operative such that the modified operating point values are determined independently of whether a target power generation of power-generating assets of the microgrid and an actual power generation of the power-generating assets of the microgrid differ from each other.

The PMS may be operative such that the modified operating point values may be determined at a fixed repetition rate, e.g. at a repetition rate shorter than 15 minutes, such as every 5 minutes or every minute.

According to another aspect of the invention, there is provided a technique in which not only one operating point vector, but several operating point vectors are calculated by the EMS and provided to the PMS.

Possible future variations of the forecast variable around a forecast variable value that is retrieved by the EMS at a certain time may thereby be fully or partially accounted for.

The PMS may then select one of the plurality of provided operating point vectors or may otherwise determine the operating point values for the controllable assets in the microgrid based on the plurality of operating point vectors.

The PMS may use various techniques, such as interpolation between operating point vectors, extrapolation from an operating point vector, or a headroom-dependent modification of the operating point values included in an operating point vector, as has been described above.

Various effects are associated with this technique. For illustration, as the EMS may perform an optimization routine to determine each one of the plurality of operating point vectors, the actually used operating point values (power setpoints for a generator, an ESS etc., and power limits for photovoltaic modules and wind generators, and load power setpoints for discretionary loads) are more likely to be optimal or close to optimal.

A method of controlling a microgrid including a plurality of controllable assets comprises retrieving, by an EMS, a forecast variable value for at least one forecast variable. The method comprises executing, by the EMS, an optimization routine to determine an operating point vector for the plurality of controllable assets that is optimal for the retrieved forecast variable value, the operating point vector including an operating point value for each of the plurality of controllable assets. The method comprises executing, by the EMS, the optimization routine to determine several additional operating point vectors for the plurality of controllable assets, the additional operating point vectors being determined to be optimal for modified forecast variable values that deviate from the retrieved forecast variable value. The method comprises providing both the operating point vector and the several additional operating point vectors to a power management system, PMS, of the microgrid.

The several additional operating point vectors may be determined for the modified forecast variable values that deviate from the retrieved forecast variable value by predefined percentages.

The modified forecast variable values may be determined by the EMS. The modified forecast variable values may thereby be generated by the EMS, rather than corresponding to any forecast variable value that is retrieved from a forecast server.

One or several of the modified forecast variable values may be determined by the EMS as a function of a retrieved forecast variable value.

One or several of the modified forecast variable values may be determined by the EMS independently of any retrieved forecast variable value.

One or several of the modified forecast variable values may be determined by the EMS based on a statistical distribution. The statistical distribution may be determined from historical data of retrieved forecast variable values.

The several additional operating point vectors may be determined for the modified forecast variable values that deviate from the retrieved forecast variable value by predefined absolute differences.

The modified forecast variable values may be distributed linearly in the space spanned by the forecast variable(s).

The modified forecast variable values may be distributed non-linearly in the space spanned by the forecast variable(s).

A number of the several additional operating point vectors that is determined may be adjusted dynamically in a time-varying manner. For illustration, the number of the additional operating point vectors may be adjusted in dependence on a computational load of the EMS and/or available communication bandwidth between the EMS and the PMS.

The operating point vector and the several additional operating point vectors may be calculated concurrently using parallel processing.

The operating point vector that is determined to be optimal for the retrieved forecast variable value and the several additional operating point vectors in combination form a plurality of operating point vectors.

The method may further comprise selecting, by the PMS, one of the plurality of operating point vectors and controlling the plurality of controllable assets based on the selected operating point vector. The PMS may select the one of the plurality of operating point vectors that has been determined for a forecast variable value that is closest to the actual value of the forecast variable at the respective time.

The method may further comprise receiving, by the PMS, the retrieved forecast variable value and the modified forecast variable values from the EMS. This information may be used by the PMS to select one or several suitable operating point vector(s) from among the plurality of operating point vectors.

The method may further comprise, in response to detecting, by the PMS, that an actual value of the forecast variable is not equal to the retrieved forecast variable value and any of the modified forecast variable values, performing an interpolation between operating point vectors or extrapolation from an operating point value. The interpolation may be performed between at least two, and optionally more than two, operating point vectors. The interpolation may preferably be performed between more than two operating point vectors if there are several forecast variables, i.e., if the forecast variables span a multi-dimensional parameter space.

The method may further comprise in response to detecting, by the PMS, that an actual value of the forecast variable is not equal to the retrieved forecast variable value and the modified forecast variable values, selecting one of the plurality of operating point vectors and subsequently modifying the operating point values included in the selected operating point vector based on an asset headroom, as has been explained above.

An EMS for a microgrid comprises an interface operative to retrieve a forecast variable value for at least one forecast variable. The EMS comprises at least one integrated semiconductor circuit operative to execute an optimization routine to determine an operating point vector for the plurality of controllable assets that is optimal for the retrieved forecast variable value, the operating point vector including an operating point value for each of the plurality of controllable assets. The at least one integrated semiconductor circuit is operative to execute the optimization routine to determine several additional operating point vectors for the plurality of controllable assets, the additional operating point vectors being determined to be optimal for modified forecast variable values that deviate from the retrieved forecast variable value. The at least one integrated semiconductor circuit is operative to provide the operating point vector and the several additional operating point vectors to a PMS of the microgrid.

The EMS may be operative such that several additional operating point vectors are determined for the modified forecast variable values that are determined by the EMS. The modified forecast variable values may thereby be generated by the EMS, rather than corresponding to any forecast variable value that is retrieved from a forecast server.

The EMS may be operative such that one or several of the modified forecast variable values are determined as a function of a retrieved forecast variable value.

The EMS may be operative such that one or several of the modified forecast variable values are determined independently of any retrieved forecast variable value.

The EMS may be operative such that one or several of the modified forecast variable values may be determined by the EMS based on a statistical distribution. The statistical distribution may be determined from historical data of retrieved forecast variable values.

The EMS may be operative such that several additional operating point vectors are determined for the modified forecast variable values that deviate from the retrieved forecast variable value by pre-defined percentages.

The EMS may be operative such that several additional operating point vectors are determined for the modified forecast variable values that deviate from the retrieved forecast variable value by pre-defined absolute differences.

The EMS may be operative such that the modified forecast variable values are distributed linearly in the space spanned by the forecast variable(s).

The EMS may be operative such that the modified forecast variable values are distributed non-linearly in the space spanned by the forecast variable(s).

The EMS may be operative such that a number of the several additional operating point vectors is adjusted dynamically. For illustration, the number of the additional operating point vectors may be adjusted in dependence on a computational load of the EMS.

The EMS may comprise a plurality of processors operative such that the operating point vector and the several additional operating point vectors are calculated concurrently using parallel processing.

A PMS for a microgrid comprises an interface operative to receive a plurality of operating point vectors for controllable assets of the microgrid. Each operating point vector may include operating point values for all the controllable assets. The PMS comprises at least one integrated semiconductor circuit operative to control the plurality of controllable assets based on the received plurality of operating point vectors.

The PMS may be operative to select one of the plurality of operating point vectors and control the plurality of controllable assets based on the selected operating point vector. The PMS may be operative to select the one of the plurality of operating point vectors that has been determined for a forecast variable value that is closest to the actual value of the forecast variable at the respective time.

The PMS may be operative to, in response to detecting that an actual value of a forecast variable is not equal to the forecast variable value and any of the modified forecast variable values for which the plurality of operating point vectors has been determined, perform an interpolation between operating point vectors or an extrapolation from an operating point value. The interpolation may be performed between at least two, and optionally more than two, operating point vectors. The interpolation may preferably be performed between more than two operating point vectors if there are several forecast variables, i.e., if the forecast variables span a multi-dimensional parameter space.

The PMS may be operative to, in response to detecting that an actual value of a forecast variable is not equal to the forecast variable value and the modified forecast variable values for which the plurality of operating point vectors has been determined, select one of the plurality of operating point vectors and subsequently modify the operating point values included in the selected operating point vector based on an asset headroom, as has been explained above.

A microgrid according to an embodiment comprises a plurality of controllable assets, the power management system of an embodiment and/or the energy management system of an embodiment.

The microgrid may optionally comprise one or several loads.

The plurality of controllable assets may comprise controllable power-generating assets and/or controllable loads, such as controllable discretionary loads.

The plurality of controllable assets may comprise renewable energy sources.

The plurality of controllable assets may comprise discretionary loads.

The plurality of controllable assets may optionally comprise one or several generators and/or one or several ESS.

The plurality of controllable assets may form a distributed energy generation system (DEG).

The PMS and/or EMS may be operative to perform the method according to the various embodiments disclosed herein.

Various effects are attained using the methods and control systems according to embodiments. The methods and control systems according to embodiments address the need for enhanced robustness against possibly incorrect forecast variable values. The methods and control systems according to embodiments mitigate the risk that a total power provided by a plurality of controllable assets in the microgrid is different from a desired target power.

BRIEF DESCRIPTION OF THE DRAWINGS

The subject matter of the invention will be explained in more detail with reference to preferred exemplary embodiments which are illustrated in the attached drawings, in which.

DETAILED DESCRIPTION OF EMBODIMENTS

Exemplary embodiments of the invention will be described with reference to the drawings in which identical or similar reference signs designate identical or similar elements. While some embodiments will be described in the context of exemplary charging infrastructure concepts and/or exemplary on-board battery concepts, the embodiments are not limited thereto. The features of embodiments may be combined with each other, unless specifically noted otherwise.

Embodiments of the invention may be used to provide enhanced robustness in the control of a microgrid against possibly incorrect forecast variable values that are used to determine operating point values for the controllable assets in the microgrid.

Figure 1:
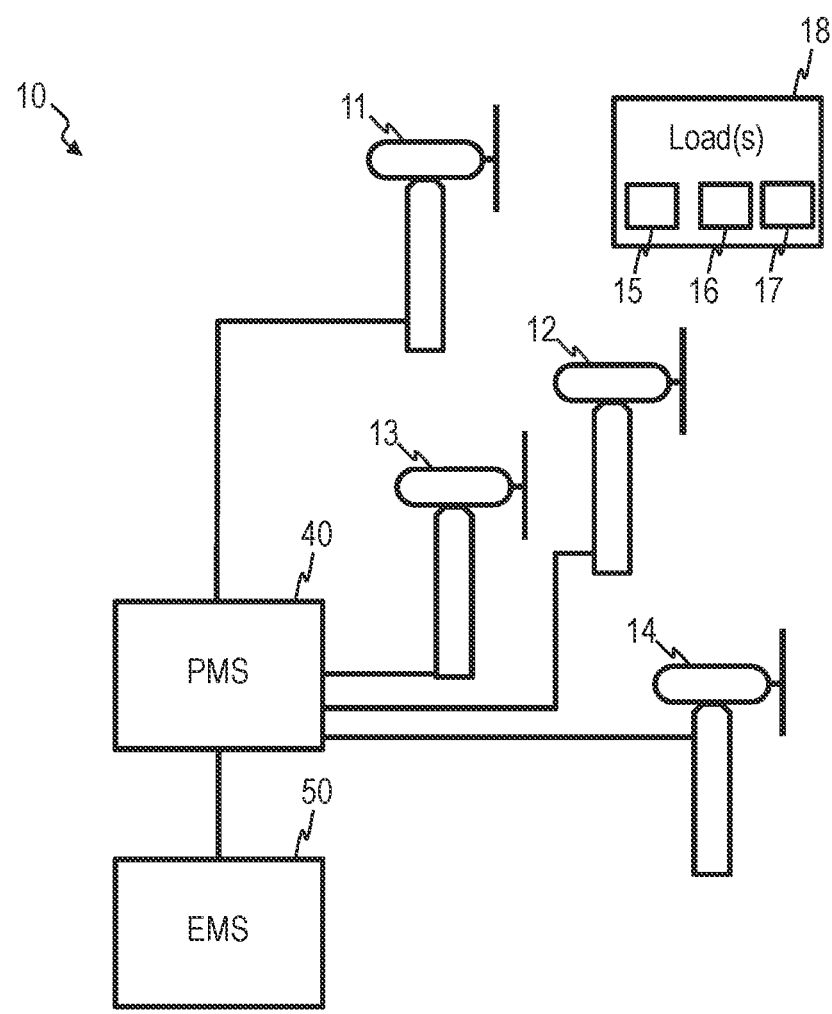
FIG. 1 is a schematic representation of a microgrid.

FIG. 1 shows an exemplary microgrid 10, which comprises a plurality of controllable power-generating assets 11, 12, 13, 14. The microgrid 10 may further comprise one or several loads 18, which may comprise one or several controllable loads 15, 16, 17. The one or several controllable loads 15, 16, 17 may comprise one or several discretionary loads. Power generation in the microgrid 10 is controlled by control systems, which include a power management system 40 and/or an energy management system 50. Operation of the power management (PMS) 40 and the energy management system (EMS) 50 according to exemplary embodiments will be described in more detail herein.

The microgrid 10 may be connected to a macrogrid. The microgrid 10 may comprise circuit breakers or other disconnectors for controllably connecting and disconnecting the microgrid from the macrogrid.

Figure 2:
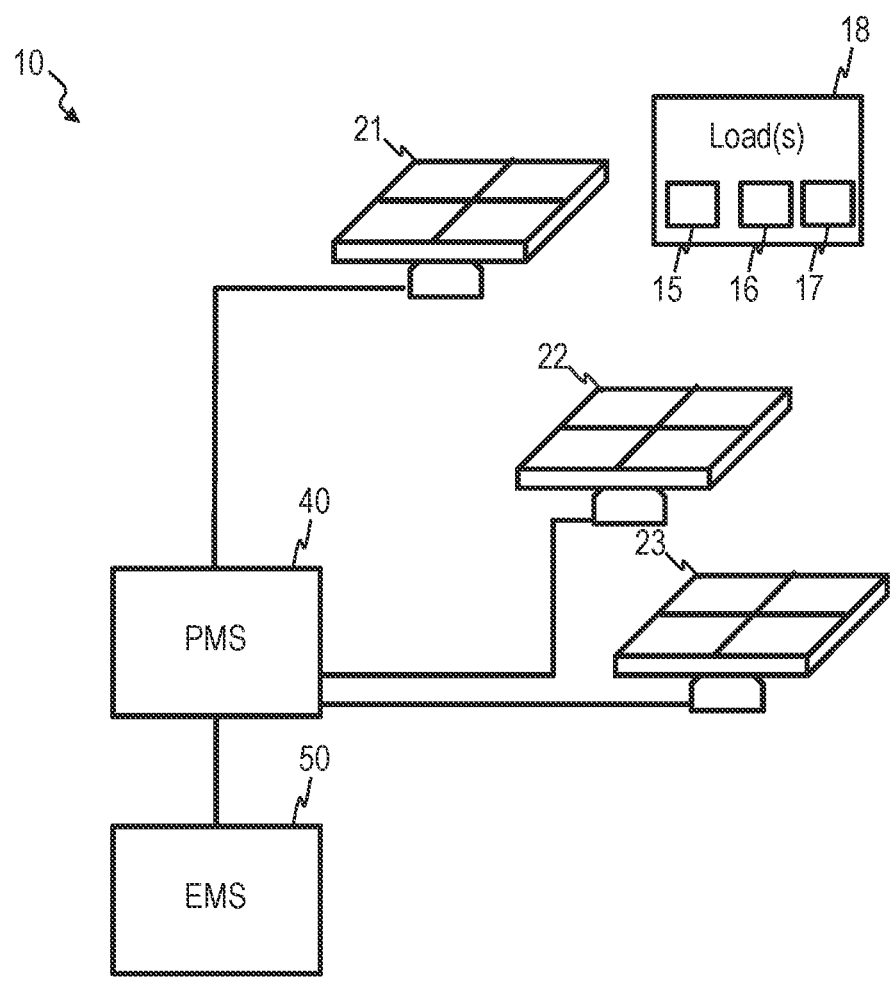
FIG. 2 is a schematic representation of a microgrid.

The plurality of controllable power-generating assets 11, 12, 13, 14 may comprise renewable energy sources, such as wind turbines as shown in FIG. 1 or photovoltaic modules 21, 22, 23 as shown in FIG. 2. The plurality of controllable power-generating assets may comprise gas turbines or other generators that operate based on fossil fuels, or energy storage systems (ESS).

The plurality of controllable loads 15, 16, 17 may comprise discretionary loads.

Figure 3:
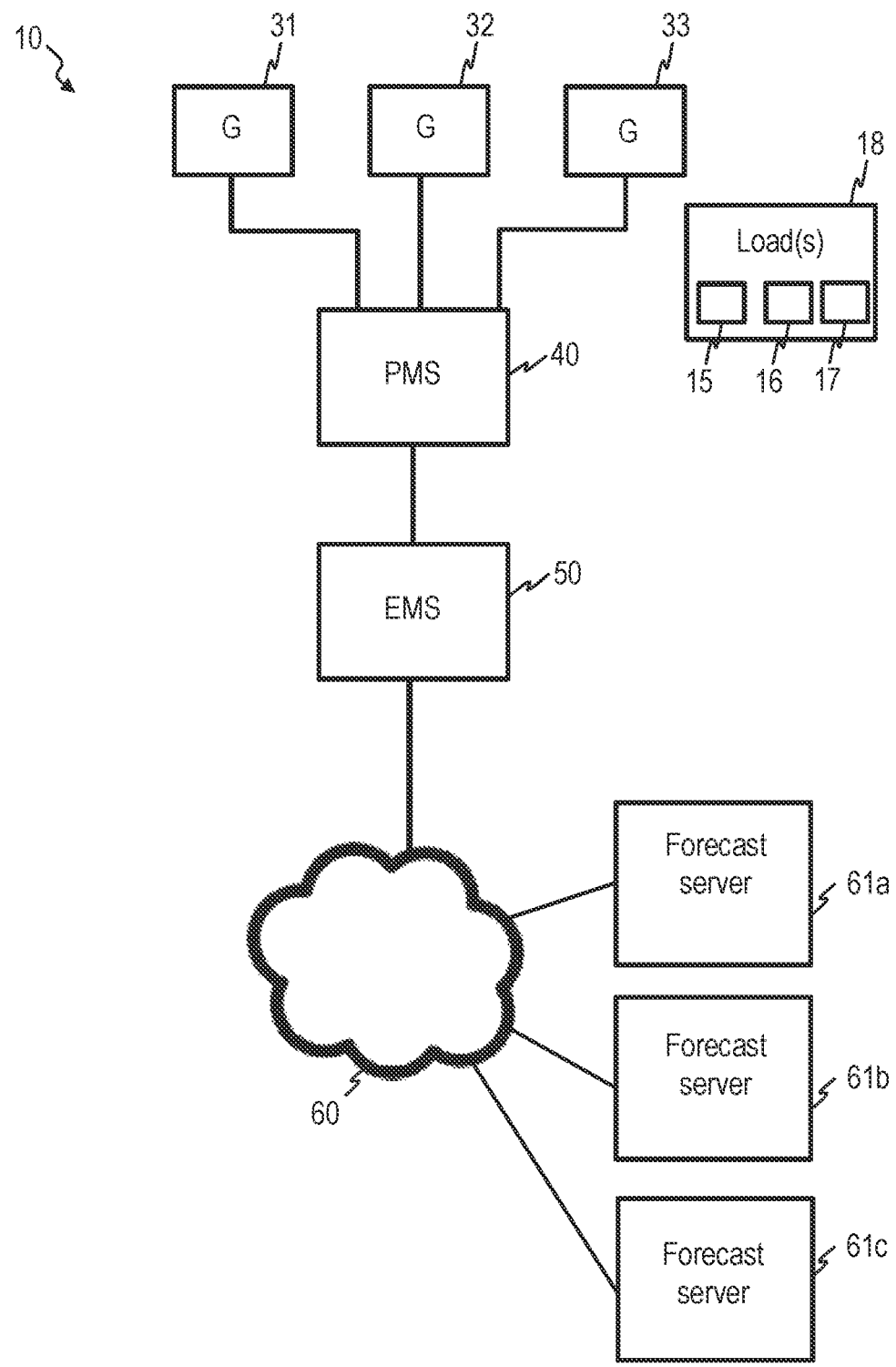
FIG. 3 is a schematic representation of a microgrid.

The plurality of controllable power-generating assets 31, 32, 33 are generally illustrated as blocks in FIG. 3, it being understood that the controllable power-generating assets may include wind turbines, photovoltaic modules, other renewable energy sources (RES), generators that consume fossil fuels, or ESS.

The PMS 40 may control and coordinate the individual assets, in particular the controllable power-generating assets and/or controllable loads. The PMS 40 may be operative to use locally known parameters, such as total load, microgrid configuration, storage state of charge (SoC), current PV and wind availability, current market pricing etc. for control purposes. The PMS 40 may also include an optimization engine that optimizes operation based on the data available to the PMS 40. This optimization may be limited, as the PMS 40 typically only has access to the locally available values and past and present-time data.

The EMS 50 may be include optimization system that uses forecasts in addition to past and present local data to calculate a better optimal operating point for each of the assets. Forecasts can be for load profiles, PV and wind availability, weather and cloud forecasting, energy market pricing etc.

The EMS 50 may be connected via a wide area network 60 to forecast servers 61a, 61b, 61c. The forecast servers may comprise weather forecast servers, market price forecast servers, load profile forecast servers, or other forecast servers.

The EMS 50 may execute an optimization procedure to determine optimal operating points for a plurality of controllable assets, in particular controllable power-generating assets and/or controllable loads of the microgrid 10. The result of the optimization procedure may be an optimal operating point value for each of the assets. The set of operating point values may be included in an ordered list or tuple, which is also referred to as operating point vector for in the art. For illustration, the set of operating point values may be represented as an operating point vector having the form $$\overrightarrow{OPV} = \begin{pmatrix} OPV_1 \\ OPV_2 \\ \vdots \end{pmatrix}. \quad (1)$$

In Equation (1), the value $OPV_i$ designates the operating point values for the controllable assets i, where the index i is an identifier for the respective asset. The operating point values $OPV_i$ are determined by the EMS 50 in such a way that the resulting operating conditions of the assets of the microgrid will be optimal, provided that the forecasted data (such as wind speed or expected load) at the respective point in time in the future (such as several minutes or several hours after the operating point vector has been determined) corresponds to the retrieved forecast variable value used by the EMS 50.

With the use of past, present and future (forecasted) data the EMS calculates the best or optimal operating point value for each asset in the form of a power setpoint (e.g. for generators, ESSs, etc.) or a power limit (for PV, wind turbines, etc.), or a load power setpoint (e.g., for discretionary loads).

This set of operating point values is "optimal" in that it results in an improved metric. Example improved metrics are, less fossil fuel usage, lower emission of $CO_2$, lower cost of operation, higher revenue, higher profit, without being limited thereto.

The EMS 50 outputs the operating point vector, which is also simply referred to as the OP vector. The operating point values may respectively be a setpoint (e.g., a power value at which a generator or ESS operates) or a limit (e.g., an upper limit on the power provided by a renewable energy source), or a load power setpoint (e.g., for discretionary loads).

This operating point vector is provided to the PMS 40 which controls the assets so that their power values are in conformity with the corresponding power setpoint or limit.

According to the invention, techniques are provided that may be used individually or in combination to mitigate the problems that are conventionally encountered when the actual value of a forecast variable (such as load at 3:00 PM) is different from the forecast variable value that has been used by the EMS (such as the load that was forecast for 3:00 PM when an operating point vector for was determined by the EMS at 2:00 PM). The microgrid 10 has to operate with a proper power balance. When the actual value and forecast variable value for a forecast variable differ from each other, it may no longer be possible to operate in accordance with the operating point vector that was originally provided by the EMS 50. The operating point value of one or several of the assets is allowed to become different (i.e., is modified) from the operating point value in the operating point vector. This means the actual operating point vector used by the PMS 40 can be different from the operating point vector provided by the EMS 50. The techniques disclosed herein address the need for determining the actual operating point values for the controllable assets, which may no longer be truly optimal, but at least insures a proper power balance (i.e., a match between the total amount of generated power on the one hand and the total power consumption by the loads and by losses on the other hand). The techniques disclosed herein also address the need for determining the operating point values for the controllable assets, which may no longer be truly optimal, but at least stays close to an optimal solution.

According to a technique of the invention, a mismatch between the actual amount of generated power that is required for power balance purposes and the forecast amount of generated power may be compensated by adjusting the operating point values for a plurality of controllable assets of the microgrid 10 that are online. The amount by which the operating point value of each asset is adjusted, e.g. incremented or decremented, may be dependent on a headroom of the respective asset.

For illustration, if there is a shortage in generated power, the operating point value of an asset may be adjusted in a manner that depends on a difference between a fixed reference value, such as the nominal maximum power rating, and the received operating point value for the asset. The amount by which the operating point value of each asset is adjusted, e.g. incremented or decremented, may also be dependent on the headroom of the other controllable assets for which the operating point is adjusted. In this manner, the adjustment of the operating point values may be implemented in such a way that the increase or decrease in operating point value of a specific asset does not only depend on the absolute headroom in generated power that is available for that asset, but also on how this increase in generated power of that asset compares to the increase in generated power that is available from the other controllable assets that are online. This aspect of the invention will be described in more detail with reference to FIGS. 4 to 6. This technique may be implemented locally at the PMS 40, without requiring any additional communication or data from the EMS 50 other than the operating point vector.

In another technique of the invention, which will be described in more detail with reference to FIGS. 7 to 14, and which may be used in combination with the previously described technique that involves headroom sharing, the EMS 50 may calculate not only one operating point vector, but several additional operating point vectors that reflect potential future variations in the forecast variables. The several additional operating point vectors may reflect a hypothetical future deviation of the forecast variable from the forecast variable value that is retrieved at the time at which the computation of the operating point vector is made. The EMS 50 may provide this set of plural operating point vectors to the PMS 40. The PMS 40 may use the plurality of operating point vectors for determining the actual operating point vector in case the actual value of the forecast variable deviates from the prediction upon which the EMS 50 based its optimization routine.

Figure 4:
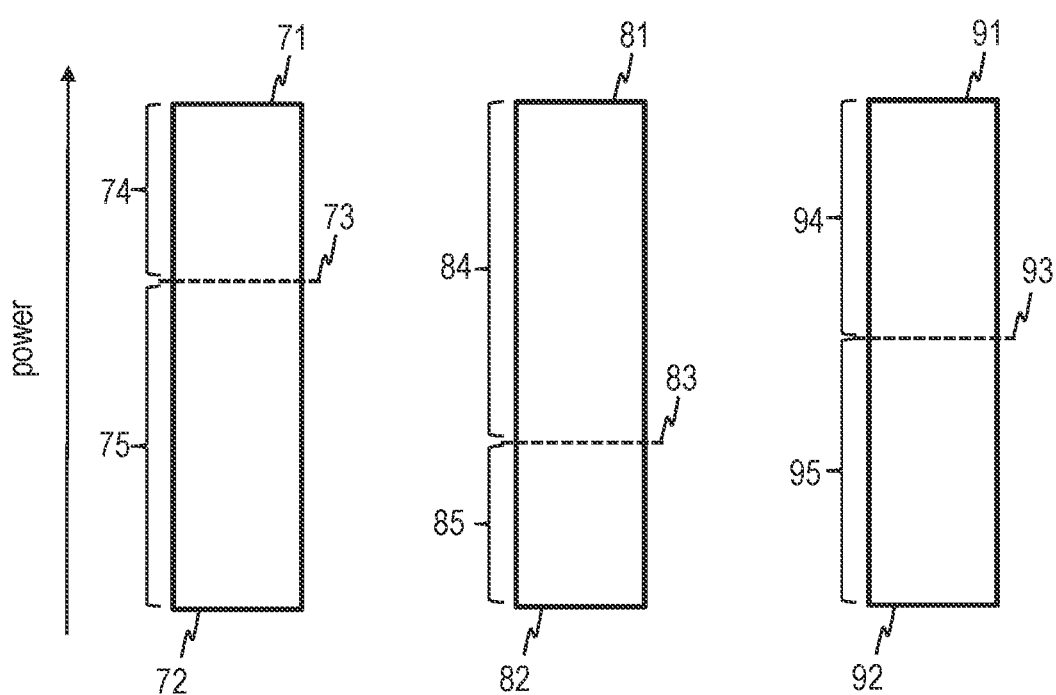
FIG. 4 illustrates operation of a power management system of a microgrid.

FIG. 4 is a schematic representation for explaining operation of the PMS 40 according to an embodiment. The PMS 40 may determine asset-specific scaling factors that are used to modify the operating point values concluded in the operating point vector received from the EMS 50. The asset-specific scaling factors may be dependent on an available asset headroom of the respective asset and, optionally, on the available asset headrooms of all controllable assets for which the operating point value is adjusted.

Two headrooms may be determined for each asset, which may correspond to the cases where generated power may need to be increased (increase headroom) and where generated power may need to be decreased (decrease headroom). Also in the case of assets that are controllable loads, two headrooms may be determined, which may correspond to the cases where power intake may need to be decreased and where power intake may need to be increased.

Generally, the asset headroom may be defined to be a difference between a fixed, asset-specific reference value and the asset operating point value 73, 83, 93 (which may be a power setpoint or a power limit, such as an upper or lower boundary and power generation). The fixed asset-specific reference value may be a nominal maximum power rating 71, 81, 91, a nominal minimum power rating 72, 82, 92, an overload power rating, or a zero power rating.

The difference which is being used as asset headroom for the headroom-dependent sharing of a total power offset depends on whether the total generated power of the controllable power-generating assets in the microgrid needs to be increased or decreased.

For illustration, if the total power output of the controllable power-generating assets in the microgrid is to be increased, the relevant headroom is the difference 74, 84, 94 that determines by how much the operating point value of the power-generating asset can be increased from the current operating point value 73, 83, 93 until a upper bound is reached, which may be the nominal maximum power rating or the overload power rating. If the total power intake of controllable assets that are loads in the microgrid is to be decreased, the relevant headroom is the difference that determines by how much the operating point value of the loads can be decreased from the current operating point value until a lower bound is reached, which may be the nominal minimum power rating or the zero power rating.

For further illustration, if the total power output of the controllable power-generating assets in the microgrid is to be decreased, the relevant headroom is the difference 75, 85, 95 that determines by how much the operating point value of the power-generating asset can be decreased from the current operating point value 73, 83, 93 until a lower bound is reached, which may be the nominal minimum power rating or zero power rating. If the total power intake of controllable assets that are loads in the microgrid is to be increased, the relevant headroom is the difference that determines by how much the operating point value of the loads can be increased from the current operating point value until an upper bound is reached, which may be the nominal maximum power rating or the overload power rating.

Thus, the headroom of an asset is the difference between the current operating point value and the maximum or minimum value. As a simple example, if a generator is rated at 1MW and it is operating at 0.6MW, the increase headroom is 0.4MW. This is the amount its power can increase before it hits the maximum limit. The generator has a power decrease headroom of 0.6MW, that is, it can decrease by 0.6MW before hitting the lower limit.

For illustration, the PMS 40 may be operative to increase the operating point values in dependence on the available increase headroom 74, 84, 94 if the power balance requires an increase in power generated by the controllable power-generating assets. The PMS 40 may also be operative to decrease the operating point values in dependence on the available decrease headroom 75, 85, 95 if the power balance requires a decrease in power generated by the controllable power-generating assets. Similar operations may be used when the power intake of controllable loads is increased or decreased.

For illustration, the PMS 40 may increase the operating point values of power-generating assets and/or may decrease the operating point values of controllable loads if the sum of generator powers that results from the operating point vector are provided by the EMS 50 is low, i.e. when the forecast generation is lower than the actual load. The increase capability of controllable power-generating assets and/or the decrease capability of controllable loads in the microgrid 10 may be utilized.

For further illustration, the PMS 40 may decrease the operating point values of power-generating assets and/or may increase the operating point values of controllable loads if the sum of all generator power that result from the operating point vector are provided by the EMS 50 is high, i.e., the forecast generation is larger than the actual load. The decrease capability of controllable power-generating assets and/or the decrease capability of all controllable loads in the microgrid 10 may be utilized.

In one exemplary implementation, the PMS 40 may determine scaling factors $SF_i$ for the controllable assets the scaling factors may be used by the PMS to modify the operating point values included in the operating point vector received from the EMS 50. The scaling factors may be monotonous function of the headroom $HR_i$ for each controllable asset.

In one implementation, the scaling factors $SF_i$ may be determined in accordance with $$SF_i = N \times HR_i, \tag{2}$$

i.e., the scaling factors may be a linear function of the headroom. N designates an asset-independent normalization constant. The headroom $HR_i$ may be the increase headroom 74, 84, 94 or the decrease headroom 75, 85, 95, depending on whether the overall output power of the controllable assets of the microgrid 10 needs to be increased or decreased or whether the overall power intake of the controllable loads of the microgrid 10 needs to be increased or decreased.

The asset-independent normalization constant may be determined as $$N = \frac{1}{\sum_i HR_i}, \tag{3}$$

where the sum is calculated over all controllable assets for which the operating point value is to be adjusted.

By using this technique, the sum of all scaling factors computed over all controllable assets for which the operating point value is to be adjusted is equal to 1 by construction.

Other techniques may be used. For illustration, the scaling factors may be determined as a non-linear function of the headroom. The scaling factors preferably are monotonous functions of the headroom, which do not necessarily need to be strictly monotonous functions.

The scaling factors a preferably determined in such a way that a sum of the scaling factors, computed over all controllable assets for which the operating point value is to be modified, is equal to 1. This can be ensured by a suitable normalization step.

The scaling factors may be determined continually by the PMS 40, i.e. on an ongoing basis and independently of whether there is a power offset. Such an implementation is beneficial in terms of stability. No further modifications in the controllers are required.

An increment or decrement of an operating point value may be computed based on the total power offset, TotPofst. The total power offset is known to the PMS 40, i.e., it can be used by the PMS 40 in determining the modified operating point values that a different from the operating point values provided by the EMS 50. The total power offset, TotPofst, is the difference between the power that actually needs to be generated in order to ensure power balance and the power that would be generated by the assets in the microgrid based on the operating point values provided by the EMS 50.

An increment or decrement of an operating point value may be computed based on the total power offset, TotPofst, and the asset-specific scaling factor. For illustration, for each of a plurality of controllable power-generating assets of the microgrid 10, the PMS 40 may calculate a modified operating point value based on the operating point value received from the EMS 50, the total power offset, and a scaling factor that is asset-specific and depends on the asset headroom of the respective asset.

For illustration, the modified operating point value for each controllable asset may be determined according to $$MOPV_i = OPV_i + SF_i \times TotPofs, \quad (4)$$

where the value $OPV_i$ designates the operating point value for the controllable asset labelled i prior to the modification, and $MOPV_i$ designates the modified operating point value that is used by the PMS 40 to control the controllable assets. In the above equation, it has been assumed that the scaling factors are always positive, while the total power offset may be positive (in case of a power deficit, i.e., when the power output needs to be increased) or negative (in case of a power surplus, i.e., when the power output needs to be decreased).

The computation of the modified operating point value may be performed continuously, i.e. on an ongoing basis by the PMS 40. In particular, if there is no total power offset (TotPofs=0), the optimal operating point values provided by the EMS 50 will automatically continue to be used. Continually performing the above-described computational operations is beneficial in terms of stability. No further modifications in the controllers are required.

The computation of modified operating point values may be performed more frequently, and in particular much more frequently, than the interval at which operating point vectors are provided by the EMS 50 to the PMS 40.

For further illustration, an exemplary implementation of how a total power offset can be shared and distributed among a plurality of controllable assets, i.e., one or several power-generating assets and/or one or several power-generating loads, will be described below.

In one exemplary implementation, if the total power generated by a plurality of controllable power-generating assets of the microgrid has to be increased, the corresponding scaling factors can be determined in accordance with the following equation:

$$SF_i = \frac{PNomMaxAct_i - OPV_i}{TotPNomMaxAct - TotEmsPSet} \quad (5)$$

where:
$SF_i$ is the asset-specific scaling factor for positive offsets,
$PNomMaxAct_i$ is the asset-specific nominal maximum active power rating,
$OPV_i$ is the asset operating point value as determined by the EMS and included in the operating point vector provided by the EMS (which may be a power setpoint or power limit),
TotPNomMaxAct is the sum of nominal maximum active power ratings of controllable power-generating assets in the microgrid that are online, i.e., TotPNomMaxAct=$\Sigma_i$ PNomMaxAct$_i$, and
TotEmsPSet is the sum of the operating point values of controllable power-generating assets in the microgrid that are online, i.e., TotEmsPSet=$\Sigma_i$ OPV$_i$.

In one exemplary implementation, if the total power generated by the plurality of controllable power-generating assets of the microgrid has to be decreased, the corresponding scaling factors can be determined in accordance with the following equation:

$$SF_i = \frac{PNomMinAct_i - OPV_i}{TotPNomMinAct - TotEmsPSet} \quad (6)$$

Where:
$SF_i$ is the asset-specific scaling factor for negative offsets,
$PNomMinAct_i$ is the asset-specific nominal maximum active power rating,
$OPV_i$ is the asset operating point value as determined by the EMS and included in the operating point vector provided by the EMS (which may be a power setpoint or power limit),
TotPNomMinAct$_i$ is the sum of nominal minimum active power ratings of controllable power-generating assets in the microgrid that are online, i.e., TotPNomMinAct=$\Sigma_i$ PNomMinAct$_i$, and
TotEmsPSet is the sum of the operating point values of controllable power-generating assets in the microgrid that are online, i.e., TotEmsPSet=$\Sigma_i$ OPV$_i$.

The above equations ensure by construction that the sum of all assets positive offset proportional factors and the sum of all assets negative offset proportional factors are 1.

Similar techniques may be used when the power intake of controllable loads is to be reduced or increased.

The PMS 40 can determine the modified operating point value for each controllable asset to be $$MOPV_i = \begin{cases} OPV_i + TotPOfst \times SF_i & \text{if } TotPOfst \geq 0 \\ OPV_i + TotPOfst \times SF_i & \text{if } TotPOfst < 0 \end{cases} \quad (7)$$

As one simple exemplary scenario, and merely for illustration rather than limitation, one can consider the case of distributing a total power offset among a first power-generating asset and a second power-generating asset of the microgrid. Each of the two power-generating assets can have a nominal minimum power rating of 0 kW and a nominal maximum power rating of 100 kW. The operating point value of the first power-generating asset as defined by the operating point vector received from the EMS 50 may be equal to 85 kW. The operating point value of the second power-generating asset as defined by the operating point vector received from the EMS 50 may be equal to 25 kW.

When the total power output needs to be increased to ensure power balance, the scaling factors can be computed as follows:

$$SF_1 = \frac{100 - 85}{200 - 110} = 0.167 \quad (8)$$

$$SF_2 = \frac{100 - 25}{200 - 110} = 0.883 \quad (9)$$

The operating point value of the second power-generating asset is increased more than the operating point value of the first power-generating asset, due to the fact that the second power-generating asset has more increase headroom. The risk of overloading of the first power-generating asset is thereby reduced.

When the total power output needs to be decreased to ensure power balance, the scaling factors can be computed as follows:

$$SF_1 = \frac{0-85}{0-110} = 0.773 \qquad (11)$$

$$SF_2 = \frac{0-25}{0-110} = 0.227 \qquad (12)$$

The operating point value of the first power-generating asset is decreased more than the operating point value of the second power-generating asset, due to the fact that the first power-generating asset has more decrease headroom.

Figure 5:
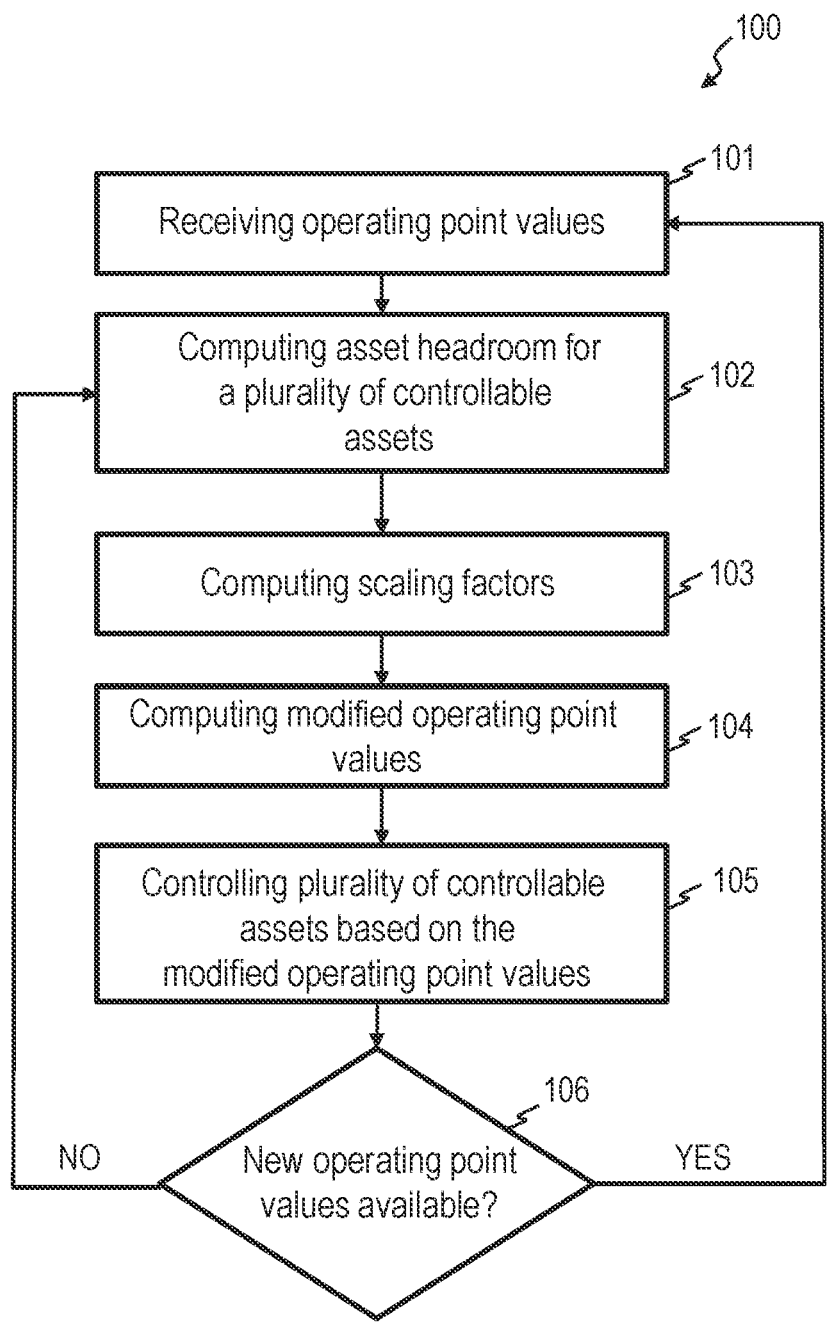
FIG. 5 is a flow chart of a method performed by a power management system of a microgrid.

FIG. 5 is a flow chart of a method 100 according to an embodiment. The method 100 may be performed by the PMS 40 according to an embodiment.

At step 101, operating point values for a plurality of controllable assets in the microgrid may be received. The operating point values may be received from the EMS 50. The operating point values may form, in combination, an operating point vector.

At step 102, the PMS 40 may compute an asset headroom for each one of a plurality of controllable assets. The asset headroom may be an increase headroom or a decrease headroom. Both increase and decrease headrooms may be computed in each iteration. The asset headrooms may be computed for all controllable assets in the microgrid that are online. The asset headrooms may be computed for one or several controllable power-generating assets and/or one or several controllable loads, such as discretionary loads.

At step 103, the PMS 40 may compute scaling factors in dependence on the asset headrooms. The scaling factor for each controllable asset may be a monotonous function of the headroom of the respective asset. Both the scaling factor for a power increase and the scaling factor for a power decrease may be computed in each iteration. The scaling factors may be computed for all controllable assets in the microgrid that are online.

At step 104, modified operating point values may be computed, e.g. in accordance with equation (4). If the total power offset is zero, the modified operating point values determined in this way will automatically coincide with the previously determined operating point values included in the operating point vector as provided by the EMS 50.

At step 105, the plurality of controllable assets in the microgrid may be controlled based on the modified operating point values. For illustration, generators or ESSs may be controlled to provide power in accordance with a modified power setpoint that corresponds to the modified operating point value. Wind turbines, photovoltaic modules, or other RES may be controlled to provide power in accordance with a modified power limit that corresponds to a modified operating point value. Discretionary loads (DLs) may be controlled to consume power in accordance with the modified power setpoints that correspond to the modified operating point values.

At step 106, a determination is made whether a new operating point vector can be expected from the EMS 50. For illustration, the EMS 50 may provide new operating point vectors at regular time intervals, such as every 5, 10, or 15 minutes. If no new operating point values are available, the method may return to step 102. Steps 102-106 may be performed more frequently than the interval at which the EMS 50 provides new operating point values, e.g., with a repetition interval that is less than 15 minutes, in particular less than 5 minutes. If new operating point values are available, the method may return to step 101.

Figure 6:
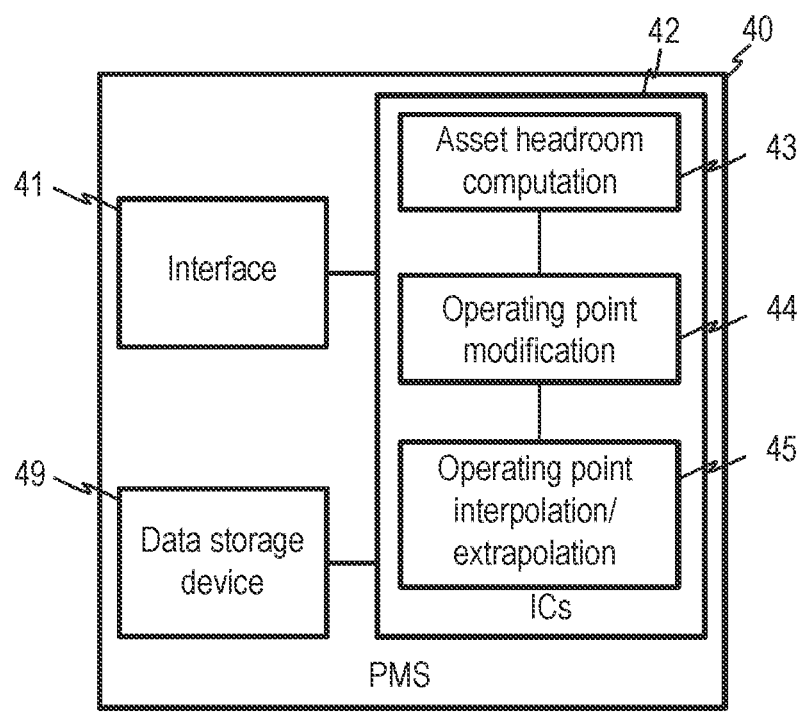
FIG. 6 is a block diagram of a power management system of a microgrid.

FIG. 6 is a schematic block diagram of a PMS 40 according to an embodiment. The PMS 40 has an interface 41 operative to receive an operating point vector from the EMS 50. The PMS 40 may include a data storage device 49 for storing locally available present or past data relating to the operation of the microgrid 10.

The PMS 40 includes one or several integrated semiconductor circuits 42. The integrated semiconductor circuits 42 may be implemented as processors, microprocessors, controllers, microcontrollers, application specific integrated circuits (ASICs), or combinations thereof.

The one or several integrated semiconductor circuits 42 may be configured, using suitable hardware, firmware, software, to execute an asset headroom computation module 43 that computes an asset headroom. The asset headroom computation module 43 may be operative to compute both increase and decrease headrooms for all controllable assets in the microgrid 10 that are online. The computation of the increase and decrease headrooms may be implemented as has been explained above.

The one or several integrated semiconductor circuits 42 may be operative to execute a modified operating point value computation module 44 for computing a modified operating point value for all controllable assets in the microgrid 10 that are online. The modified operating point value computation module 44 may be communicatively coupled to the asset headroom computation module 43 to receive the increase and/or decrease headrooms therefrom.

The one or several integrated semiconductor circuits 42 may be operative to provide the modified operating point values to the controllable assets, e.g. via interface 41, or to otherwise controlling operation of the controllable assets that are online based on the modified operating point values.

The one or several integrated semiconductor circuits 42 may be operative to execute an operating point value interpolation and/or extrapolation module 45. The operating point value interpolation and/or extrapolation module 45 may interpolate between operating point values that are included in concurrently received operating point vectors and/or may extrapolate from an operating point value included in the plurality of received operating point vectors. One scenario where the operating point interpolation or extrapolation may be useful will be described with reference to FIGS. 7 to 14.

Various effects are associated with the techniques described with reference to FIGS. 1 to 6. For illustration, the method of distributing power offsets in accordance with the increase or decrease headroom among several controllable assets that are online is simple to implement. No additional calculations are required in the EMS 50. No additional data exchange between the EMS 50 and the PMS 40 is required.

While the technique may use a modified operating point values that may be suboptimal, a new operating point vector will be provided by the EMS 50 in regular intervals. Therefore, operating in a suboptimal regime for a short time interval between receipt of two successive operating point vectors from the EMS 50 may be tolerable. The suboptimal operating points are derived from pre-computed optimal operating points, and are typically assumed to be reasonably close to optimal.

Referring out to FIGS. 7 to 14, another technique will be described that provides enhanced robustness of microgrid operation in the case of incorrect forecast variable values.

Conventionally, the EMS 50 retrieves forecast variable values at regular intervals, such as in intervals of 5, 10, or 15 minutes. Other intervals may be used. The EMS 50 executes an optimization routine to determine operating point values for all assets. Conventionally, a single operating point vector is provided by the EMS 50 to the PMS 40. This single operating point vector is truly optimal only if all forecast variable values are correct. Power imbalance may occur if one or several forecast variable values are incorrect and no countermeasures are taken.

According to the techniques that will be described in detail with reference to FIGS. 7 to 14, the EMS 50 calculates several additional operating point vectors, so as to generate a plurality of operating point vectors that are provided to the PMS 40 in each periodic cycle of EMS operation. The several additional operating point vectors are not the optimal solution for the retrieved forecast variable values, but account for hypothetical variations around the retrieved forecast variable values.

Figure 7:
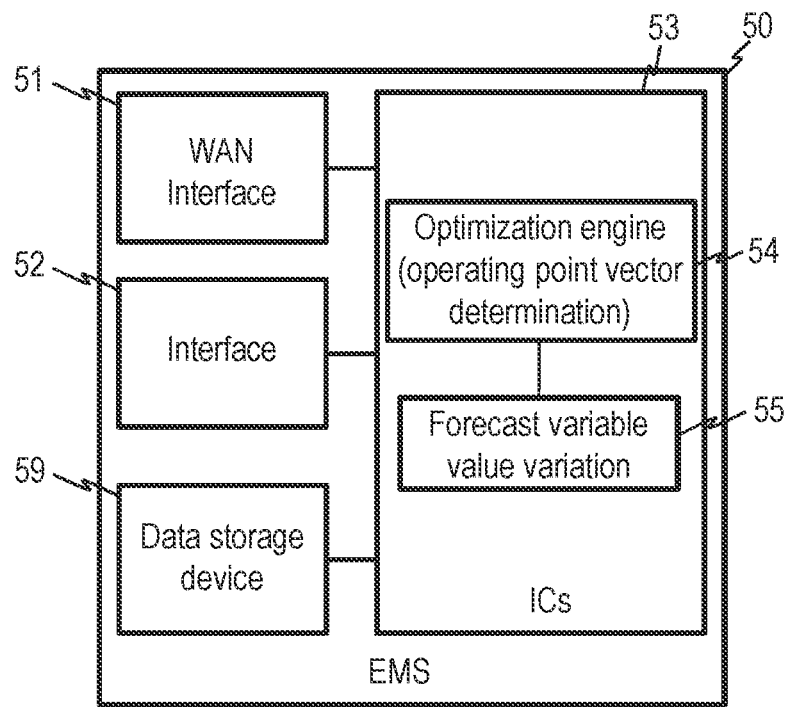
FIG. 7 is a block diagram of an energy management system of a microgrid.

FIG. 7 is a block diagram of an EMS 50 according to an embodiment. The EMS 50 may comprise a wide area network (WAN) interface 51 to retrieve forecast variable values over a wide area network 60. The EMS 50 may retrieve forecast variable values over an interface that does not need to be a WAN interface. The EMS 50 may communicate with the PMS 40 over the WAN interface 51 or may have a dedicated interface 52 for communication with the PMS, e.g., for ensuring high bandwidth between the PMS 40 and the EMS 50. The EMS 50 may comprise a data storage device 59 that stores past and present data of the microgrid 10.

The EMS 50 includes one or several integrated semiconductor circuits 53. The integrated semiconductor circuits 53 may be implemented as processors, microprocessors, controllers, microcontrollers, application specific integrated circuits (ASICs), or combinations thereof. As will be explained in more detail below, the EMS 50 may comprise a plurality of parallel processors that are operative to compute a plurality of operating point vectors in parallel.

The integrated semiconductor circuits 53 may be configured by use of suitable hardware, firmware, or software to execute an optimization routine 54. The optimization routine may be operative to determine the operating point values for controllable assets in the microgrid 10 so as to find the maximum or minimum of a target function. The target function may be indicative of fuel consumption, $CO_2$ emission, overall revenue, or another metric. Implementations of the optimization routine performed by the EMS 50 are known to the skilled person and will not further be described herein.

The integrated semiconductor circuits 53 may be configured by use of suitable hardware, firmware, or software to perform a forecast variable value variation 55. The module 55 may be operative, in response to receipt of the retrieved forecast variable value, to determine two or more modified forecast variable values that are different from and vary around the forecast variable value that has been retrieved from a forecast server.

The integrated semiconductor circuits 53 may be operative such that an operating point vector is determined not only for the forecast variable value (which may include a plurality of variable values if there is a multi-dimensional space spanned by the forecast variables) that have been retrieved from the forecast servers, but that additional operating point vectors are determined for the modified forecast variable values that are artificially generated by the EMS 50.

Various techniques can be used to generate the modified forecast variable values by the EMS 50 such that the modified forecast variables differ from the retrieved forecast variable values.

Figure 8:
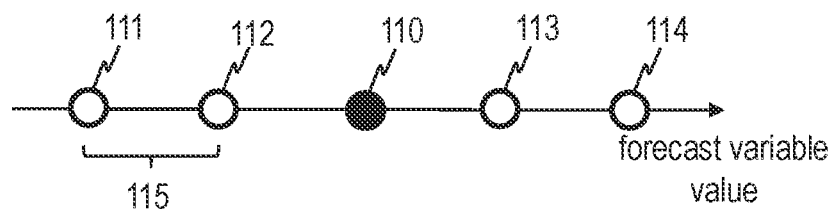
FIG. 8, FIG. 9, and FIG. 10 are schematic representations illustrating operation of an energy management system of a microgrid.

For illustration, as illustrated in FIG. 8, a plurality of modified forecast variable values 111, 112, 113, 114 may be generated that are distributed around the retrieved forecast variable value 110. The modified forecast variable values and the retrieved forecast variable value may be linearly distributed, as illustrated in FIG. 8. The spacing 115 between adjacent variable values may have a fixed absolute value or may be a fixed percentage of the retrieved forecast variable value 110.

Figure 9:
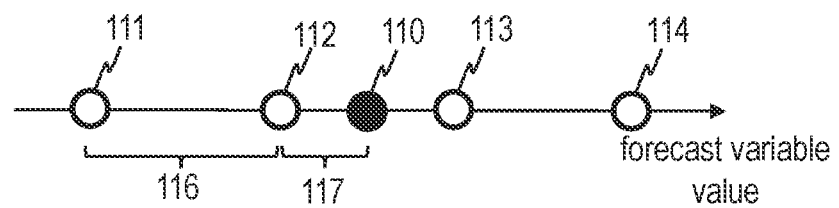

For further illustration, as illustrated in FIG. 9, a plurality of modified forecast variable values 111, 112, 113, 114 may be generated that a distributed around the retrieved forecast variable value 110. The modified forecast variable values and the retrieved forecast variable value may be non-linearly distributed, as illustrated in FIG. 9. I.e., a spacing 116 between a first pair of adjacent variable values 111, 112 is different from a spacing 117 between a second pair of adjacent variable values 112, 110 for which an operating point vector is computed. Each spacing 116, 117 between adjacent variable values may have a fixed absolute value. Each spacing 116, 117 between adjacent variable values may be a fixed percentage of the retrieved forecast variable value 110, or the spacing 117 may be a fixed percentage of the spacing 117, with the spacing 117 being either a fixed absolute value or a given percentage of the retrieved variable value 110, or vice versa.

The spacing may increase in a direction away from the retrieved variable value 110, as illustrated in FIG. 9, to account for the fact that large deviations from the retrieved forecast variable value may become increasingly less likely.

Alternatively, the spacing may decrease in a direction away from the retrieved variable value 110, to account for the fact that large deviations from the retrieved forecast variable value may entail an increasing demand for the provision of truly optimal operating parameter vectors.

While a one-dimensional array of variable values is schematically illustrated in Figure's 8 and 9, several forecast variables (such as 2, 3, 4 or more than 4 forecast variables) may be used by the EMS 50. In this case, modified forecast variable values may be defined in a higher-dimensional forecast variable space.

Figure 10:
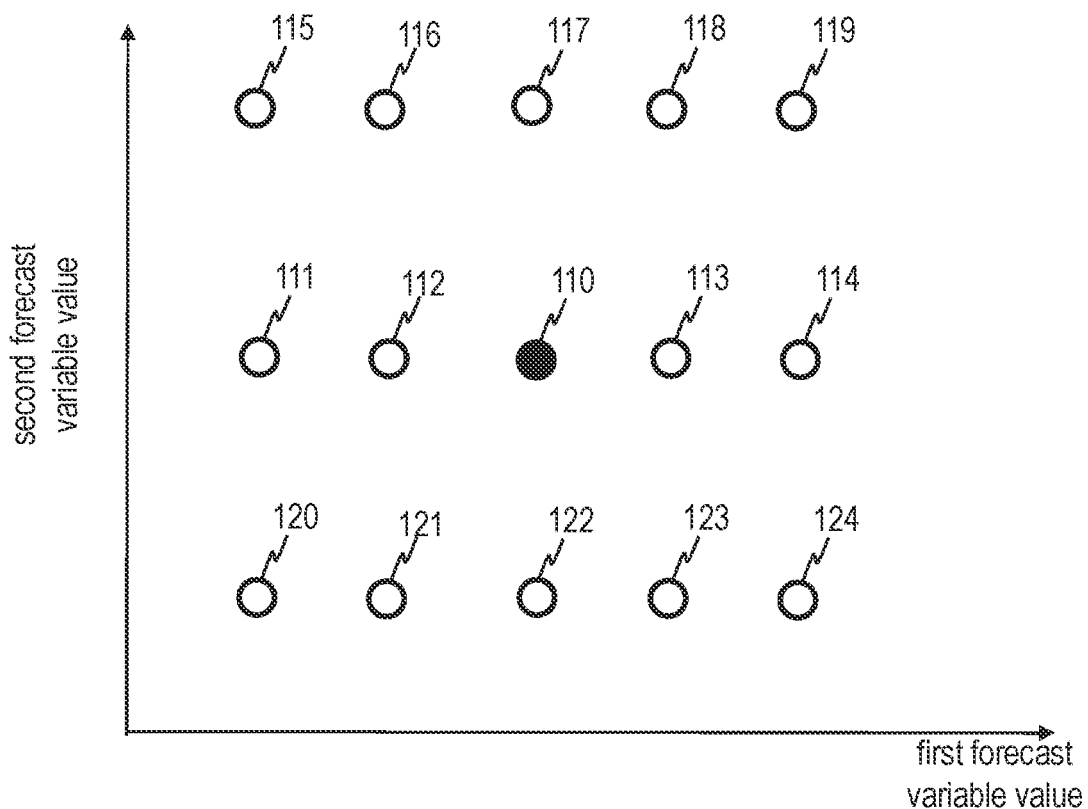

FIG. 10 is a schematic representation illustrating the generation of modified forecast variable values around a retrieved 2-tuple of forecast variable values 110. Modified 2-tuples of forecast variable values 111-124 may be arranged in a regular arrangement around the retrieved forecast variable values. The spacing between adjacent columns and rows of the modified forecast variable values may, but do not need to be the same.

As has been described with reference to FIG. 8 and FIG. 9, the spacing between adjacent modified variable values may be defined by absolute numbers or as a percentage, e.g., a percentage of the first and second retrieved variable values of the 2-tuple 110.

As has been described above, the modified forecast variable values do not need to be regularly distributed. Rather, nonlinear distributions and arrangements of modified forecast variable values may be used.

While a 2-dimensional array of modified forecast variable values as illustrated in FIG. 10, the above principles are similarly applicable to the case where more than two forecast variables are used by the EMS 50.

The modified forecast variable values may, but do not always need to be determined based on the retrieved forecast variable value.

The present technique is particularly amenable to parallel computing. This is illustrated in FIG. 11.

Figure 11:
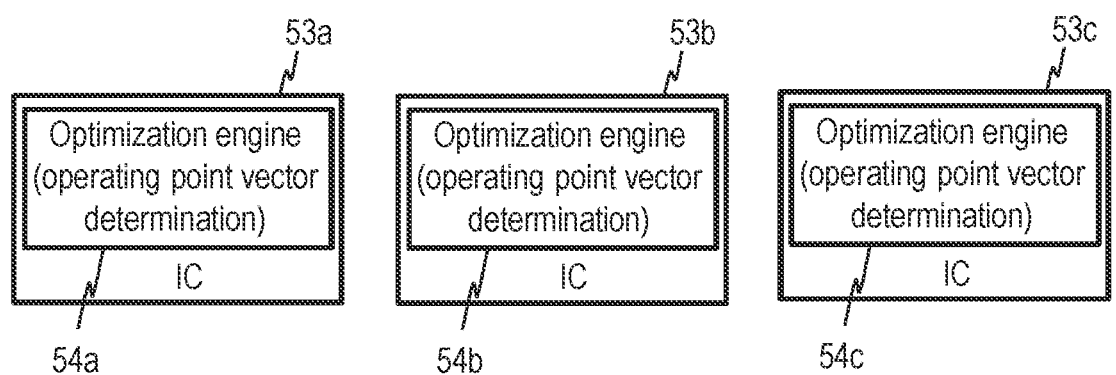
FIG. 11 is a block diagram of parts of an energy management system of a microgrid.

FIG. 11 shows an arrangement of several parallel integrated circuits, which may be parallel processors 53*a*, 53*b*, 53*c*. Each of the parallel processors 53*a*, 53*b*, 53*c* may execute its own instance of the optimization routine 54*a*, 54*b*, 54*c*.

One of the integrated circuits, such as processor 53*a*, may compute the operating point vector for forecast variable values that are equal to the variable values retrieved from the forecast servers. One or several additional integrated circuits, such as processors 53*b*, 53*c*, may compute the operating point vectors for modified forecast variable values that are deliberately varied around the retrieved forecast variable values by the EMS 50.

The total number of modified forecast variable values, and thus the total number of operating point vectors that is computed by the EMS 50 and provided to the PMS 40 in each cycle of EMS operation, may be dynamically adjusted. The total number of operating point vectors may be adjusted based on a computation load of the EMS 50 and/or available communication bandwidth between the EMS 50 and the PMS 40.

The set of all operating point vectors that includes the operating point vectors for the retrieved forecast variable values and the several additional operating point vectors for the modified forecast variable values that have been generated by the EMS 50 may be concurrently transmitted by the EMS 50 to the PMS 40.

Thus, in order to address the problem that one or more of the forecasts can be incorrect, the EMS can create a set of EMS OP vectors for a given variation in a given forecasts.

For illustration only, if the load is one of the forecasted values, a set of eleven operating point vectors could be created for the following loads that correspond to the retrieved forecast variable value and ten modified forecast variable values: forecast −50%, forecast −40%, forecast −30%, forecast −20%, forecast −10%, forecast, forecast +10%, forecast +20%, forecast +30%, forecast +40%, forecast +50%. The number and/or distribution of the loads is not germane, and another number of modified load values or a non-linear distribution could be used.

While one or several of the modified forecast variable values for which an operating point vector is determined may be dependent on the retrieved forecast variable value, this is not required. For illustration, alternatively or additionally, one or several of the modified forecast variable values for which an operating point vector is determined may be determined so as to be independent of any one of the retrieved forecast variable value. One or several of the modified forecast variable values may have default values and/or values generated in accordance with a random distribution. This may be particularly suitable if a forecast variable value cannot be retrieved at the time at which the operating point vector is calculated (e.g., because the associated forecast server is down), but a statistical distribution for the forecast variable value is available based on, e.g., historical data stored in the EMS or elsewhere.

This set of operating point vectors would be transmitted to the PMS 40. If the load is different from the forecast variable value, the alternative operating point vector closest to the actual load could be used and all the assets are made to operate with the corresponding operating point values. This maintains an optimal or close to optimal operating point even when the actual load value is different from the forecast load value. Other, more complex techniques can be used, as will be described below.

The associated forecast variable value(s) and modified forecast variable value(s) may also be transmitted by the EMS 50 to the PMS 40.

Figure 12:
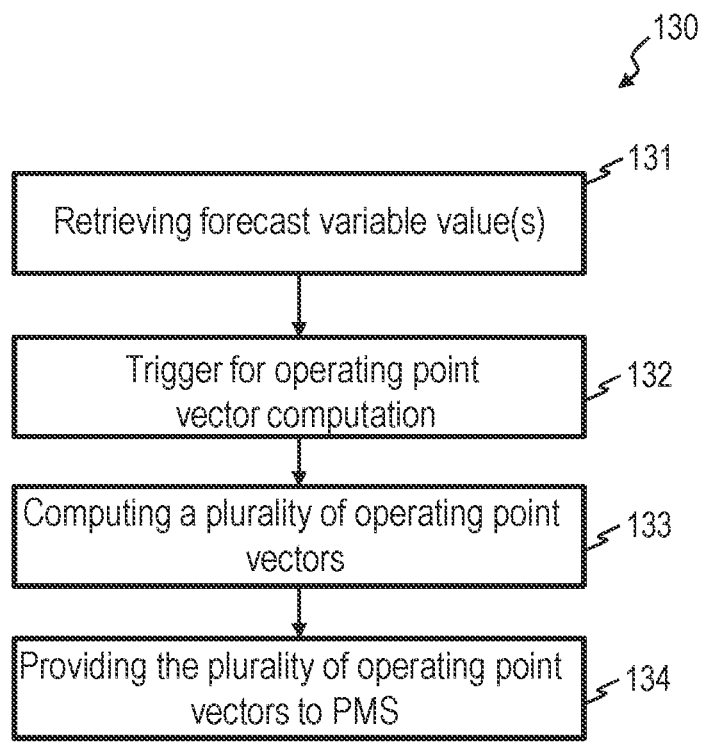
FIG. 12 is a flow chart of a method performed by an energy management system of a microgrid.

FIG. 12 is a flow chart of a method 130 according to an embodiment. The method 130 may be performed by the EMS 50.

At step 131, forecast variable values are retrieved for one or several forecast variables. Retrieval of the forecast variable values may be triggered in repeated time intervals, e.g. at a predefined time interval before the computation of the operating point vector is started.

At step 132, the computation of the operating point vector may be triggered. That trigger event may be expiry of a timer, such that a new plurality of operating point vectors is computed in particular time intervals, e.g. every 5 minutes, every 10 minutes, or every 15 minutes.

At step 133, a plurality of operating point vectors is computed. One of the operating point vectors corresponds to the forecast variable values for one or several forecast variables that have been retrieved from forecast servers at step 131. The several additional operating point vectors represent the optimal solution for forecast variables that are different from and vary about the forecast variable values for one or several forecast variables that have been retrieved from forecast servers at step 131.

One or several of the modified forecast variable values may be determined by the EMS 50 as a function of a retrieved forecast variable value.

One or several of the modified forecast variable values may be determined by the EMS 50 independently of a retrieved forecast variable value.

One or several of the modified forecast variable values may be determined by the EMS 50 based on a statistical distribution determined from historical data of forecast variable values.

At step 134, the plurality of operating point vectors may be provided to the PMS 40. The plurality of operating point values may be provided concurrently to the PMS 40. Information on the forecast variable values and the modified forecast variable values that have been used for each of the operating point vectors may also be provided to the EMS 50.

The PMS 40 may use the plurality of operating point vectors in various ways. For illustration, the PMS 40 may select the one of the plurality of operating point vectors for which the actual forecast variable value is closest to the forecast variable value that had been used by the EMS 50 in its optimization computation.

Alternatively or additionally, the PMS 40 may use the headroom-dependent distribution of a power offset that has been described with reference to FIGS. 1 to 6 or may perform an interpolation or extrapolation between the operating point values included in two or more operating point vectors. This may be done after the PMS 40 has identified the operating point vector(s) that are determined for forecast variable values that are closest to the actual value of the forecast variable. The interpolation or extrapolation may be performed by the operating point interpolation and/or extrapolation module 45 that has briefly been explained with reference to FIG. 6.

Figure 13:
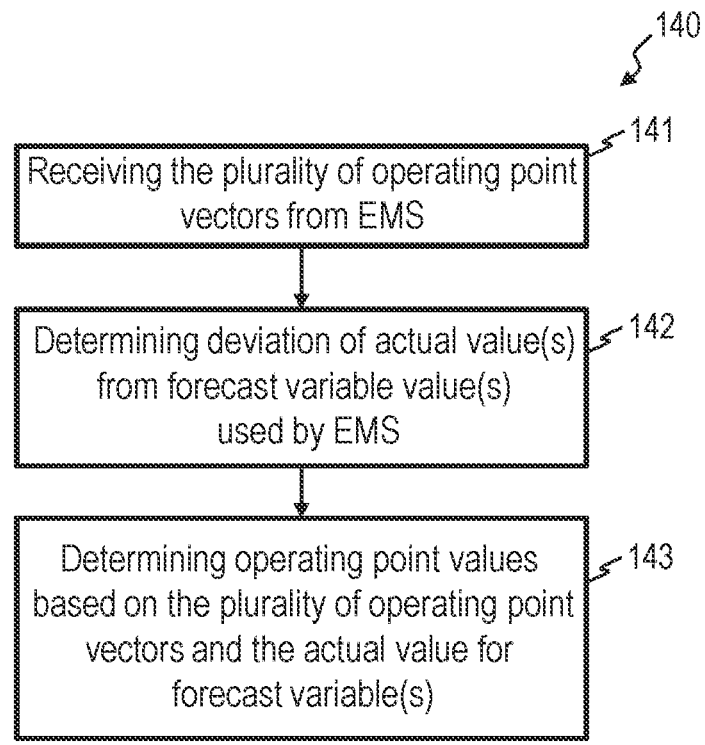
FIG. 13 is a flow chart of a method performed by a power management system of a microgrid.

FIG. 13 is a flow chart of a method 140 according to an embodiment. The method 140 may be performed by the PMS 40.

At step 141, the PMS 40 receives a plurality of operating point vectors from the EMS 50. The plurality of operating point vectors may be generated by the EMS 50 using the techniques explained above.

At step 142, the PMS 40 may determine that one or several actual values of forecast variables (such as the actual load that is locally available in the microgrid) is/are different from the forecast variable values that have been used by a EMS 50. For illustration, a power offset may be detected.

At step 143, they PMS 40 may determine operating point values for a plurality of controllable assets in the microgrid 10 using the plurality of operating point vectors. The actual values of the forecast variables may be used in this process, e.g. to select one or several operating point vectors that most closely match the actual value of the forecast variable (such as actual load), to perform a headroom-dependent distribution of a power offset amongst the controllable assets that are online, to perform a linear or other interpolation between the operating point values included in two or more of the operating point vectors, or to perform a linear or other extrapolation from one of the operating point values.

Figure 14:
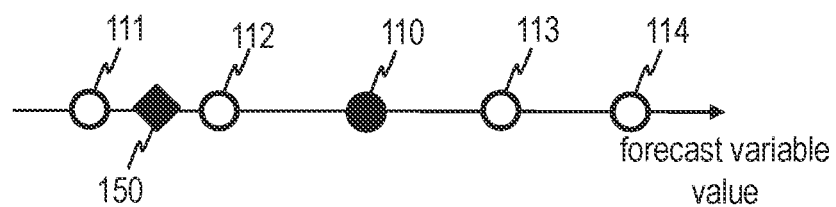
FIG. 14 is schematic representation illustrating operation of a power management system of a microgrid.

FIG. 14 illustrates operation of the PMS 40. If an actual value 150 of a forecast variable (such as the actual load in the microgrid) deviates from the forecast variable value 110, the PMS 40 may determine operating point values based on one or several of the additional operating point vectors that have been determined for the modified forecast variable values 111, 112. For illustration, if the actual value 150 of the forecast variable is closest to the modified forecast variable value 112, the operating point value associated with the modified forecast variable value 112 may be used by the PMS 40 and its control.

Alternatively, if the actual value 150 is located in between two of the variable values for which an operating point vector has been determined by the EMS, such as between the modified forecast variable values 111, 112, an interpolation between the operating point values included in the operating point vectors associated with the modified forecast variable values 111, 112 may be performed. The interpolation may be a linear or non-linear interpolation. The interpolation does not need to be limited to two operating point vectors. For illustration, when n forecast variables are used, the interpolation may generally be between $2^n$ adjacent operating point vectors.

Alternatively, if the actual value 150, is located in between two of the variable values for which an operating point value has been determined, such as between the modified forecast variable values 111, 112, the operating point values included in one of the adjacent operating point vectors associated with the modified forecast variable values 111, 112 may be used as a starting point. The PMS 40 may then perform the headroom-dependent distribution of a power offset to ensure power balance, using the techniques described with reference to FIGS. 4 to 6.

Various effects are associated with this technique. For illustration, the system operates at, or very close to the optimal operating point, even when one or a multitude of the forecasts is incorrect.

For further illustration, even if neither one of the plurality of operating point vectors coincides with a truly optimal operating point vector, the distance to an optimal operating point vector will be small, so the solution will be close-to-optimal.

Computational complexity in the EMS 50 increases in this technique. This can be compensated for, fully or at least in part, by using parallel processing.

Bandwidth between the EMS 50 and the PMS 40 may need to be taken into consideration when a possibly high number of operating point vectors may need to be communicated. Communication bandwidth is not a limiting factor when the EMS 50 and the PMS 40 are co-located in the microgrid 10.

While the invention has been described in detail in the drawings and foregoing description, such description is to be considered illustrative or exemplary and not restrictive. Variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

What is claimed is:

1. A method of controlling a microgrid including a plurality of controllable assets, the method comprising:
    retrieving, by an energy management system, EMS, a forecast variable value for at least one forecast variable;
    executing, by the EMS, an optimization routine to determine an operating point vector for the plurality of controllable assets that is optimal for the retrieved forecast variable value, the operating point vector including an operating point value for each of the plurality of controllable assets;
    executing, by the EMS, the optimization routine to determine several additional operating point vectors for the plurality of controllable assets, the additional operating point vectors being determined to be optimal for modified forecast variable values that deviate from the retrieved forecast variable value;
    providing both the operating point vector and the several additional operating point vectors to a power management system, PMS, of the microgrid;
    selecting, by the PMS, one of the operating point vectors; and
    controlling the plurality of controllable assets based on the selected operating point vector.

2. The method of claim 1, wherein the several additional operating point vectors are determined for the modified forecast variable values that
    deviate from the retrieved forecast variable value by pre-defined percentages or by pre-defined absolute differences; and/or
    are distributed linearly or non-linearly.

3. The method of claim 1, wherein the operating point vector and the several additional operating point vectors are calculated concurrently using parallel processing.

4. The method of claim 1, further comprising:
    in response to detecting, by the PMS, that an actual value of the forecast variable is not equal to the retrieved forecast variable value and the modified forecast variable values,
        performing an interpolation between operating point vectors;
        performing an extrapolation using at least one of the operating point vectors; or
        performing the method according to claim 1.

5. A system comprising:
an energy management system, EMS, for a microgrid including a plurality of controllable assets, the EMS comprising:
   an interface operative to retrieve a forecast variable value for at least one forecast variable; and
   at least one integrated semiconductor circuit operative to
      execute an optimization routine to determine an operating point vector for the plurality of controllable assets that is optimal for the retrieved forecast variable value, the operating point vector including an operating point value for each of the plurality of controllable assets;
      execute the optimization routine to determine several additional operating point vectors for the plurality of controllable assets, the additional operating point vectors being determined to be optimal for modified forecast variable values that deviate from the retrieved forecast variable value;
      provide the operating point vector and the several additional operating point vectors to a power management system, PMS, of the microgrid;
   the PMS comprising:
      at least one integrated semiconductor circuit operative to:
         select one of the operating point vectors; and
         control the plurality of controllable assets based on the selected operating point vector.

6. The method of claim 1, further comprising determining, by the EMS, the modified forecast variable values.

7. The method of claim 6, wherein one or several of the modified forecast variable values are determined by the EMS as a function of a retrieved forecast variable value and/or wherein one or several of the modified forecast variable values are determined by the EMS independently of any retrieved forecast variable value.

8. The method of claim 1, wherein one or several of the modified forecast variable values are determined by the EMS based on a statistical distribution.

9. The method of claim 1, wherein a number of the several additional operating point vectors that is determined is adjusted dynamically in a time-varying manner.

10. The method of claim 9, wherein the number of the additional operating point vectors is adjusted in dependence on a computational load of the EMS and/or an available communication bandwidth between the EMS and the PMS.

11. A microgrid, comprising:
a plurality of controllable assets;
an energy management system, EMS, comprising:
   an interface operative to retrieve a forecast variable value for at least one forecast variable; and
   at least one integrated semiconductor circuit operative to
      execute an optimization routine to determine an operating point vector for the plurality of controllable assets that is optimal for the retrieved forecast variable value, the operating point vector including an operating point value for each of the plurality of controllable assets;
      execute the optimization routine to determine several additional operating point vectors for the plurality of controllable assets, the additional operating point vectors being determined to be optimal for modified forecast variable values that deviate from the retrieved forecast variable value; and
      provide the operating point vector and the several additional operating point vectors to a power management system, PMS, of the microgrid;
the PMS comprising:
   an interface operative to receive operating point values for a plurality of controllable assets of the microgrid; and
   at least one integrated semiconductor circuit operative to:
      determine an asset headroom that is dependent on a difference between an asset-specific fixed parameter value for the controllable asset and the received operating point value for the controllable asset;
      determine a modified operating point value for each controllable asset of at least a sub-set of the plurality of controllable assets, the modified operating point value for a controllable asset being dependent on the received operating point value of the controllable asset, the asset headroom of the controllable asset, and a total power offset of the microgrid, wherein the PMS is operative such that determining the modified operating point value comprises determining a product of the total power offset of the microgrid and an asset-specific scaling factor, the asset-specific scaling factor being dependent on the asset headroom; and
      control the controllable assets for which the modified operating point values have been determined in accordance with the modified operating point values.

* * * * *